(12) United States Patent
LaMothe et al.

(10) Patent No.: US 6,771,513 B2
(45) Date of Patent: Aug. 3, 2004

(54) MODULAR CONTROLLER HOUSING HAVING MOVABLE CARD GUIDES

(75) Inventors: Brian P. LaMothe, Conrad, IA (US); Irvin J. Schwartzenburg, Marshalltown, IA (US); Richard J. Vanderah, Marshalltown, IA (US); Oliver J. Olivero, St. Charles, IL (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 10/267,506

(22) Filed: Oct. 9, 2002

(65) Prior Publication Data

US 2003/0067752 A1 Apr. 10, 2003

Related U.S. Application Data

(60) Provisional application No. 60/327,923, filed on Oct. 9, 2001.

(51) Int. Cl.[7] ................................................. H05K 5/06
(52) U.S. Cl. ....................... 361/752; 361/797; 361/800; 361/756
(58) Field of Search ................................ 361/752, 802, 361/797, 800, 714, 724, 756, 727, 741, 686; 439/377

(56) References Cited

U.S. PATENT DOCUMENTS

| | | | | |
|---|---|---|---|---|
| 4,068,290 A | * | 1/1978 | Wetherbee | 361/802 |
| 4,861,277 A | * | 8/1989 | Bina | 439/377 |
| 5,544,969 A | * | 8/1996 | Ammon et al. | 403/322.1 |
| 5,666,271 A | * | 9/1997 | Kim et al. | 361/726 |
| 6,309,237 B1 | * | 10/2001 | Longueville | 439/267 |

* cited by examiner

Primary Examiner—David Martin
Assistant Examiner—Hung Bui
(74) Attorney, Agent, or Firm—Mark E. Scott; Conley Rose, P.C.

(57) ABSTRACT

The specification discloses a controller housing that utilizes card guides that may be installed and removed without the use of tools. Various arrangements of the controller housing with and without the card guides allows for the controller housing to accept electronic circuit cards of varying sizes. Thus, if a manufacturer desires to increase the number of points on an input/output card, for example, those additional points need not necessarily be contained in a card having the same form factor. Instead, the manufacturer may provide a larger form factor card and that card may be inserted into the controller housing by appropriately adjusting the location of the card guide within the particular opening into which the new card is to be inserted.

21 Claims, 5 Drawing Sheets

MODULAR CONTROLLER HOUSING HAVING MOVABLE CARD GUIDES

CROSS-REFERENCE TO RELATED APPLICATIONS

This application claims the benefit of provisional application Ser. No. 60/327,923 filed Oct. 9, 2001, and which is incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The preferred embodiments relate generally to housings for electronic circuit cards, and more particularly, to controller housings for holding one or more electronic circuit cards.

2. Background of the Invention

Controller housings are generally known in the art that hold one or more circuit cards, referred to herein as simply "cards." Slots are typically provided inside the housing and are spaced so that pairs of slots engage opposite edges of a card inserted in the pair of slots. The slots may be formed in card guides supported inside the housing, where the card guides are fixed to the housing or may be releasably fastened to the housing using screws or the like.

Controller housings are known in which the card guides are movable to accommodate different card sizes. For example, it may be necessary or desirable to replace a current card with a new card having a different size—a different form factor. To reposition a conventional card guide, if this is possible at all, a tool such as a screwdriver is needed to unfasten the card guide from the old position and refasten the card guide in the new position. Such a process is labor and time intensive.

Conventional controller housings are sized according to the number and size of cards needed. While additional room may be provided for changes in card size or additional cards to be added later, the additional room is limited. Accordingly, if significant card changes or additions are needed, a new housing must also be provided.

Thus, what is needed in the art is a mechanism whereby the card guides in a controller housing can be easily removed or relocated to accommodate varying size circuit cards. Also what is needed in the art is a controller housing that is easily expandable to accommodate additional circuit cards.

BRIEF SUMMARY OF SOME OF THE PREFERRED EMBODIMENTS

The problems noted above are solved in large part by a modular controller housing, each controller housing utilizing card guides that do not require the use of tools for removal or relocation. In the preferred embodiments, each controller housing has two elongated openings that allow for insertion of circuit cards into the interior of the housing. Each opening in the preferred embodiments is capable of accepting up to two card guides. By selectively adding and removing card guides, each opening is therefore capable of accepting varying size circuit cards. With each possible card guide installed in a particular opening, three one-third size circuit cards may be inserted into the opening, thereby coupling the cards to a back-plane board mounted within and at the rear of the controller housing. If one of the card guides is removed from the exemplary opening, then the opening is capable of accepting a one-third size circuit card, and a two-thirds size circuit card. If both card guides are removed from the exemplary opening, then the opening is capable of accepting one full size circuit card.

In the preferred embodiments, the card guides may be installed and removed without the use of tools. That is, the card guides preferably snap into place by use of corresponding structures on an internal surface of the respective opening, and the card guide. Addition and removal of card guides in the preferred embodiments is accomplished by snapping the card guides into or out of place. When inserted, the card guides provide slots in which circuit cards slide during insertion and removal, and rest during use.

The preferred embodiments also comprise a modular controller housing such that additional controller housing may be placed together to form a larger housing as needed. The combination of the modular controller housing and the card guides that allow openings in the modular housings to take on varying sizes, creates an easily expandable and versatile controller housing for electronic circuit cards.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
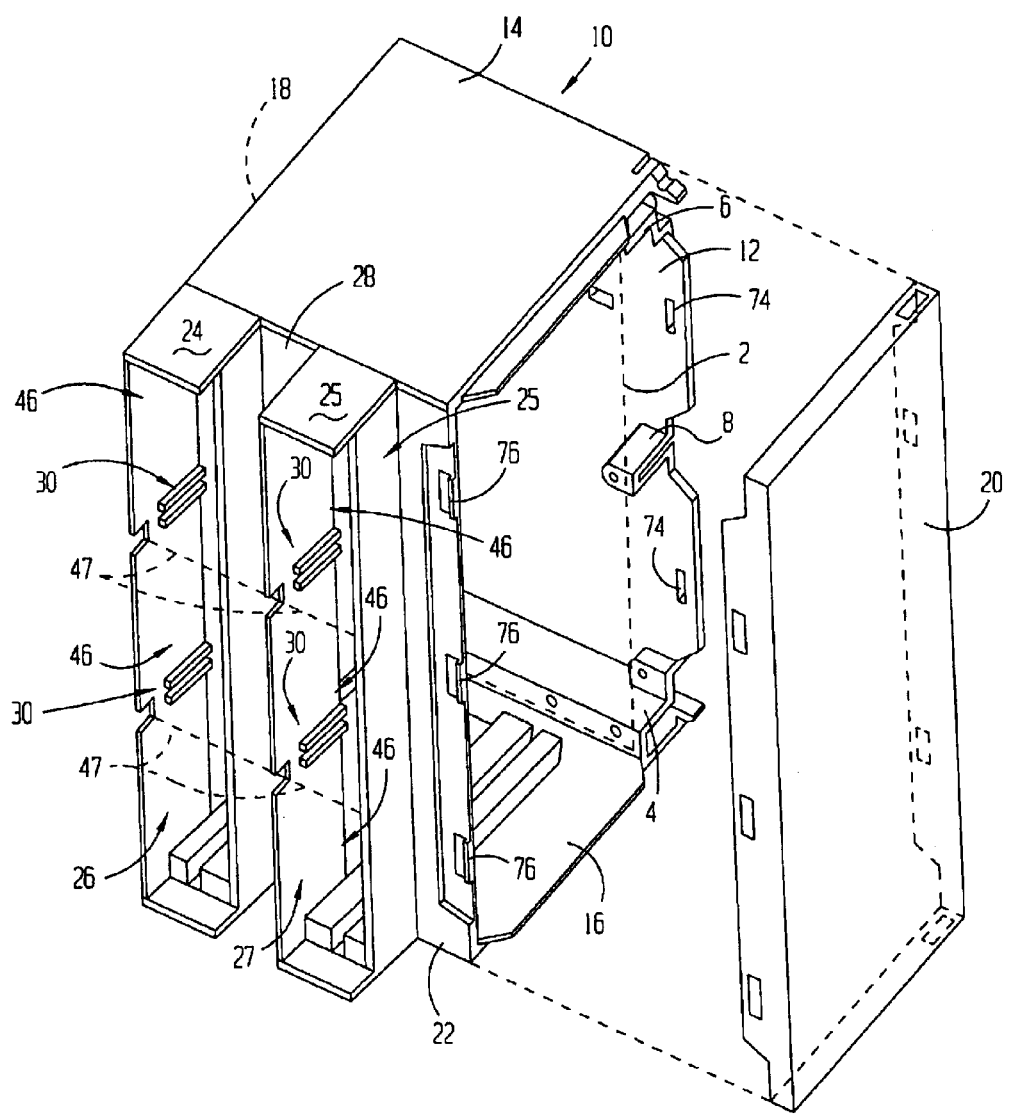
FIG. 1 shows a perspective view of a controller housing of the preferred embodiments.

FIG. 1 shows a controller housing 10 constructed in accordance with the preferred embodiments. The housing 10 comprises a rear panel 12, top and bottom panels 14, 16 respectively, and side panels 18, 20. The various panels, in whole or in part, define an interior of the housing. Side panels 18, 20 may be removably attached to the housing 10 for purposes of coupling together additional controller housings. Projecting from a front side 22 of the housing are two collars 24, 25 defining openings 26, 27 for providing access to the interior of the housing. The collars 24, 25 are separated by a central support 28. The controller housing 10 is preferably designed and constructed such that electronic circuit cards may be inserted and removed through the openings 26, 27. The housing 10 preferably comprises a backplane board 2 (shown in dashed lines in FIG. 2 so as not to obscure the drawings) having electrical connectors thereon that mechanically and electrically couple to the circuit cards inserted through the openings 26, 27. The backplane board of the preferred embodiment is held in position by a combination of shoulders 4, 6, as well as stand-off 8 (and an additional stand-off not seen in the perspective view of FIG. 1).

Figure 2:
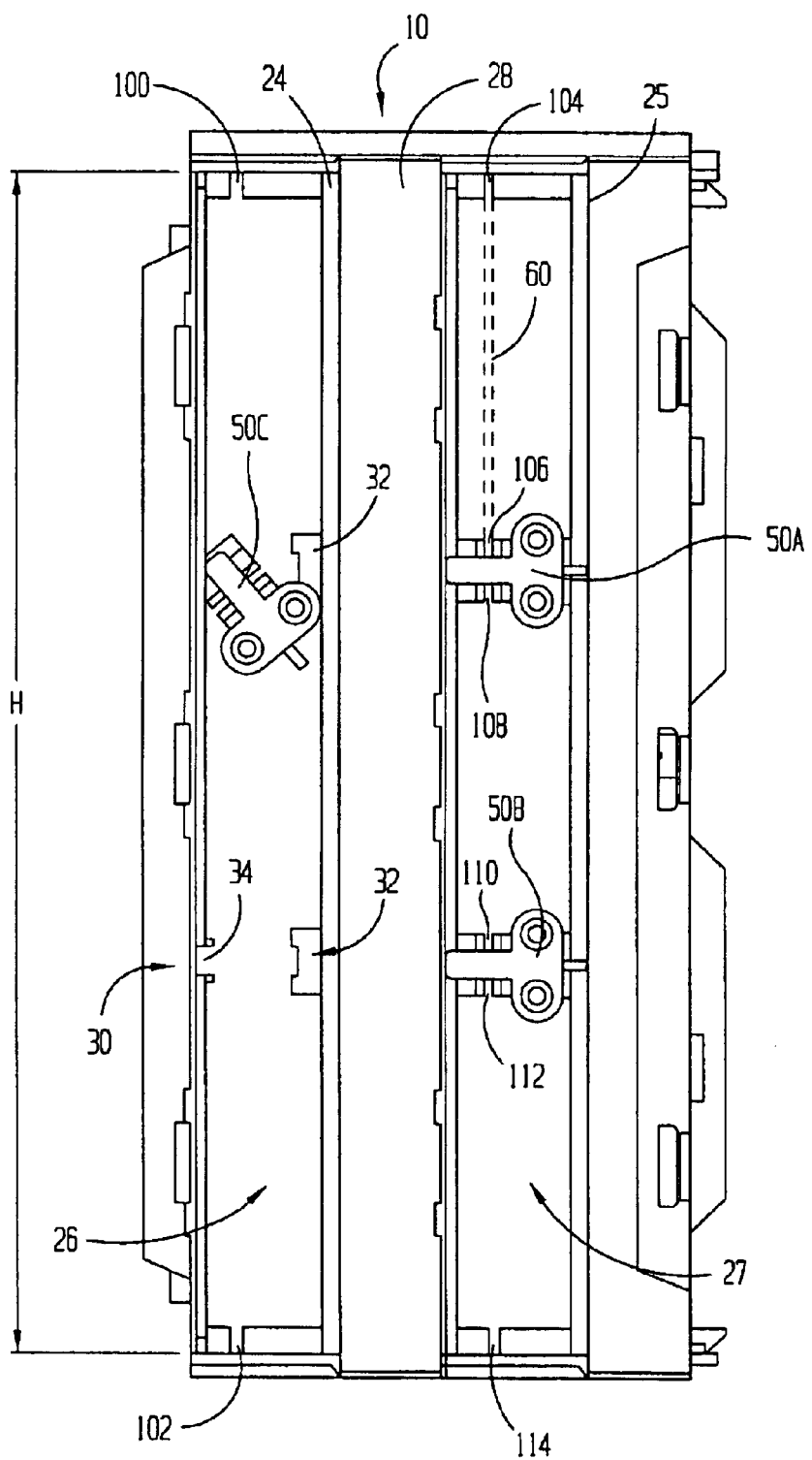
FIG. 2 shows a front elevation view of a controller housing with card guides attached therein.

The controller housing 10 of the preferred embodiments is capable of accepting electronic circuit cards of varying sizes; that is, having different form factors. FIG. 2 shows a front elevational view of the housing 10 of the preferred embodiments. Each opening 26, 27 defines an overall height H, as shown in FIG. 2, which in the preferred embodiments is approximately 8.91 inches. In an opening with no card guides 50 installed therein, a full height H circuit card may be inserted into the opening, with an upper edge of the card sliding in slot 100, and a lower edge of the card sliding in slot 102. The housing 10 of the preferred embodiments is also capable of accepting electronic circuit cards smaller than the full height H cards. That is, by insertion of card guides 50, the full height openings 26, 27 may be divided into smaller sizes. Still referring to FIG. 2, opening 27 is shown with two card guides 50A and 50B installed therein. Card guides 50, whose construction and installation will be discussed more thoroughly below, make the opening 27 of the housing 10 capable of accepting circuit cards of smaller size. FIG. 2 shows, in dashed lines, an exemplary one-third height card 60 installed in an upper-most location. In this upper-most location of opening 27, a top edge of the circuit card slides in slot 104, and a lower edge of the circuit card slides in slot 106 in an upper portion of the card guide 50A. As is exemplified in FIG. 2, installing two card guides 50 in an opening 27 (or opening 26) of the preferred embodiments enables the opening to receive three one-third size circuit cards. If only one card guide, for example card guide 50C in opening 26 of FIG. 2 is installed (it is noted that the card guide 50C is shown only partially installed in FIG. 2), then the opening 26 is capable of accepting a one-third height circuit card, and a two-thirds height circuit card. Having thus described the versatility of the controller housing 10 of the preferred embodiments, attention is now turned to various components of the housing 10 that facilitate installation and removal of the card guides, as well as the card guides themselves.

In order to hold the card guides in place, each opening 26, 27 of the preferred embodiment has connection portions therein to facilitate releasably installing the card guides. While the portions may take many forms, in the preferred embodiments the connection portions comprise two matched sets of a card guide support track 30 and a stationary snap-lock tab 32. The card guide support tracks 30 are seen both in the perspective view of FIG. 1, as well as the elevational view of FIG. 2. The snap-lock tabs 32 are seen in the elevational view of FIG. 2 and the rear perspective view of FIG. 3. Each card guide support track 30 comprises a first receiving notch or channel 34 which supports a card guide 50 when installed, and also provides a point of rotation during installation of the card guides, to be discussed more fully below. Opposite of the card guide support track 30 is a snap-lock tab 32.

Figure 3:
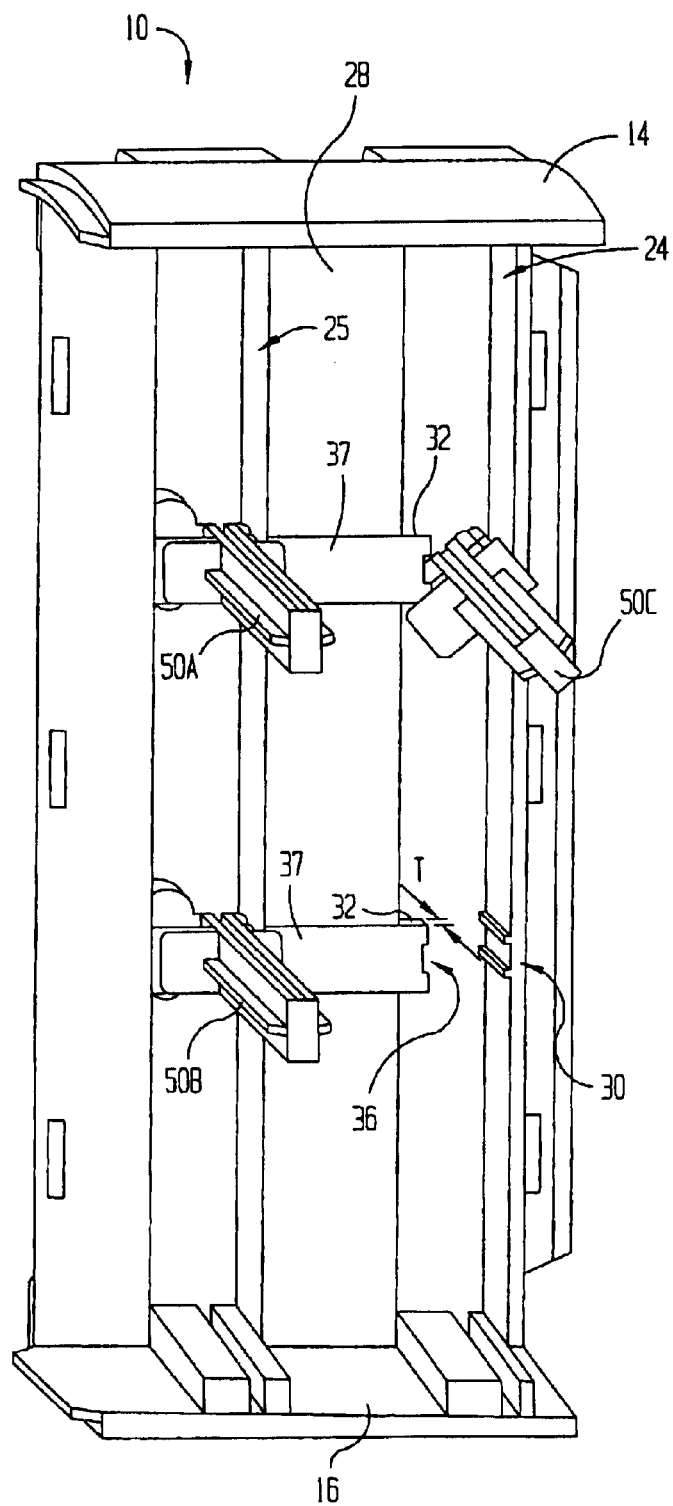
FIG. 3 shows a rear perspective cut-away view of the controller housing of FIG. 2, a rear panel of the housing cut away.

Referring now to FIG. 3, which shows a rear perspective view of the controller housing 10 of the preferred embodiments with the back panel 12 cut away, there is shown the snap-lock tab 32 in better detail. In particular, the snap-lock tab 32 in the preferred embodiments is a protruding tab-type structure having a notch 36 cut in a distal end thereof. Moreover, the snap-lock tab 32 has a thickness, identified in FIG. 3 as "T", which in the preferred embodiments is approximately 0.13 inches. As will be subsequently discussed, the snap-lock tab 32 fits in mating relationship with a corresponding structure on the card support guides 50.

The card guide support tracks 30, and corresponding snap-lock tabs 32, are spaced within each opening 26, 27 to define a plurality of storage spaces 46 corresponding to portions of the housing 10 interior. In the embodiment illustrated in FIGS. 1–3, two sets of tracks 30 and snap-lock tabs 32 are provided within each opening 26, 27 to define a total of six storage spaces 46 (three spaces 46 for each opening 26, 27). The storage spaces are illustrated in FIG. 1 using dashed lines 47. Referring to FIG. 2, there is shown, in dashed lines, a circuit card 60 within an upper storage space in the opening 27. In this configuration, the upper storage space is defined by the slot 104 at the upper portion of the opening 27, and the slot 106 on a first side of the card guide 50A, the slots thus being in functional alignment. Correspondingly, a second storage location is defined by the slot 108 in a lower portion of the card guide 50A and slot 110 in the upper portion of card guide 50B. Finally, a third storage location is defined by slot 112 and a lower portion of the card guide 50B and slot 114 in the lower portion of the opening 27. As has been previously discussed, the card guides 50A and 50B may be selectively removed to define a plurality of possible card sizes that could be accepted by the opening 27. For example, if the card guide 50B is removed, then opening 27 is capable of receiving a one-third height circuit card 60, as well as a two-thirds height circuit card, whose card edges would slide in slot 108 on a lower part of card guide 50B and slot 114. Moreover, if both the card guides 50A and 50B were removed, a full height card could be inserted into the opening 27, and the card edges of such a full height card would slide in slots 104 on a top portion of the opening 27 and slot 114 on the bottom portion.

Figure 4:
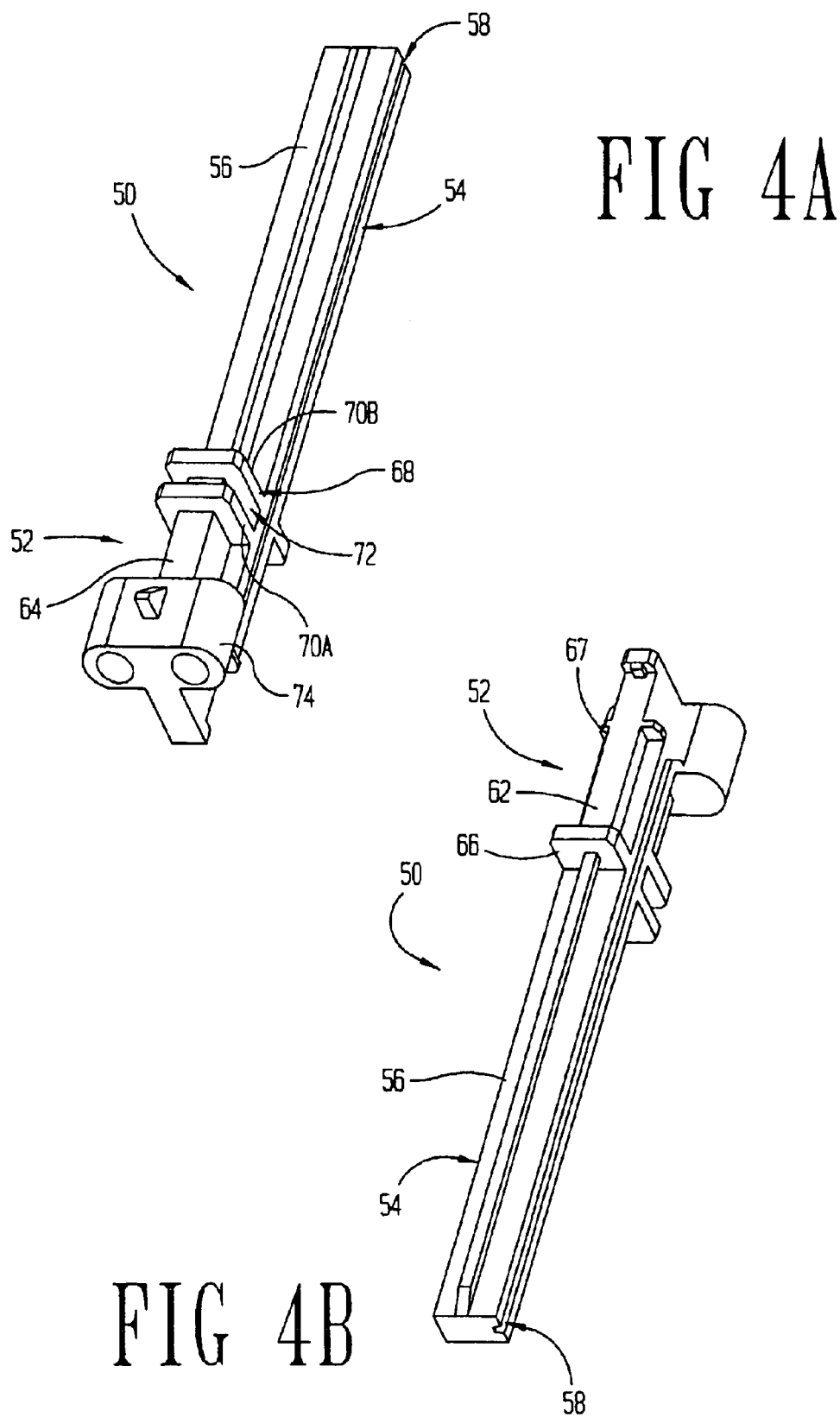
FIGS. 4A and 4B show perspective views of a removable card guide.
Figure 5:
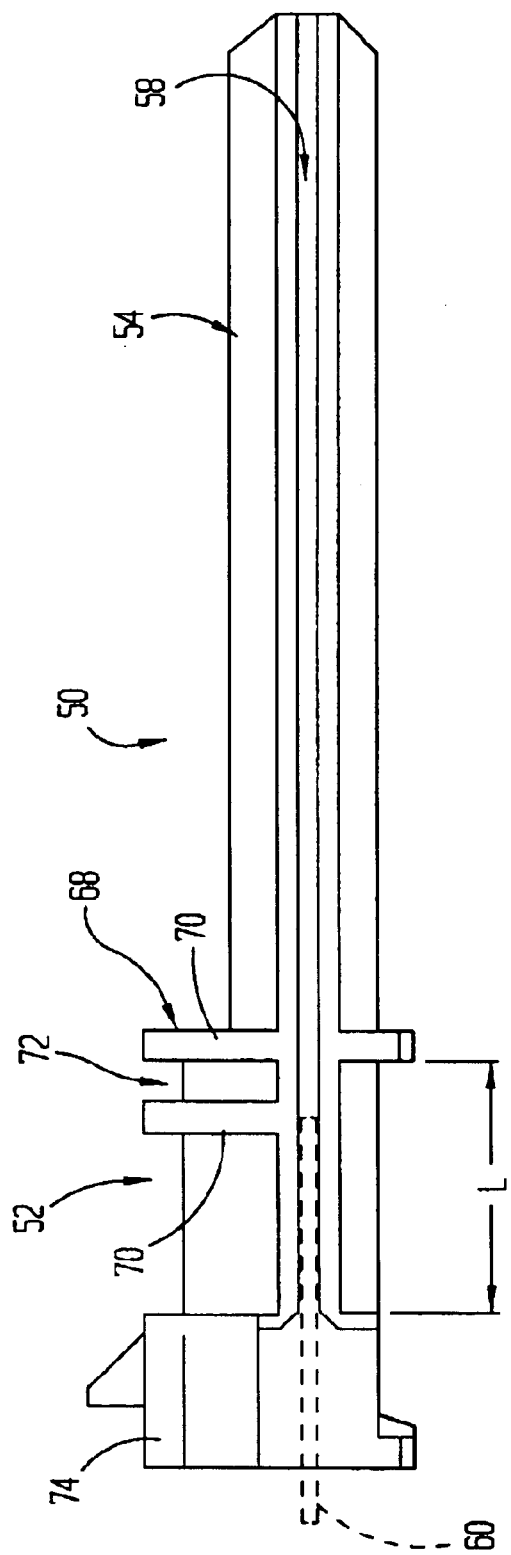
FIG. 5 shows a top plan view of the removable card guide illustrated in FIGS. 4A and 4B.

In the preferred embodiments, card guides 50 are provided that may be snap-fit into openings 26, 27. As best shown in FIGS. 4A, 4B and 5, each card guide 50 comprises a connection portion 52 and a card support portion 54. The card support portion 54 may be in the form of an elongate body 56 having pairs of spaced apart walls extending from upper and lower faces of the body 56 to define slots 58. The slots 58 are sized to closely fit the width of a circuit card 60 (shown partially inserted and in dashed lines in FIG. 5).

The connection portion 52 of each card guide 50 comprises a first tab 62 extending from a side of the card guide 50, and a second tab 64 extending from an opposite side of the guide. The first and second tabs 62, 64 are sized to have widths that closely match the receiving channel 34 of the card guide support tracks 30 and the notches 36 in the snap-lock tabs 32 respectively. A stop 66 also projects from a side of the card guide 50 rearwardly of the first tab 62, and a clip 68 is formed by a pair of closely spaced walls 70 projecting from an opposite side of the guide 50 from the second tab 62. The clip 68 defines a gap 72 sized to accommodate the thickness "T" of the snap-lock tab 32. A grip 74 is provided on a front end of the card guide 50 to allow the guide to be grasped and manually manipulated.

Each card guide 50 may be simply and easily attached within an opening 26, 27 without the use of tools. In the preferred embodiments, installation of the card guides 50 preferably involves a user grasping the card guide 50 at the grip 74, and placing the card guide's elongate body 56 in the interior of the controller housing, with the card guide 50 at an angle with respect to its final position, such as card guide 50C in FIG. 2. As implied by the drawing of FIG. 2, in one embodiment the first tab 62 is placed within the card guide support track 30. The axial length "L" (see FIG. 5) of the first tab 62 (defined on one end by stop 66 and on a second end by shoulder 67) is only slightly larger than a length (measured perpendicular to the backplane board 2) of the card guide support track 30, and is approximately 20% of an overall length of the card guide. Thus, placing the first tab 62 in the card guide support track 30 aligns the clip 68 (on the opposite side of the card guide 50) with the snap-lock tab 32. Once the first tab 62 is in at least semi-mating relationship with the card guide support track 30, the user rotates the card guide 50 (with the combination of first tab 62 and card guide support track 30 being the point of rotation) until the portion of the second tab 64 that forms the clip 68 snaps into mating relationship with the snap-lock tab 32. The rear perspective view of FIG. 3 shows the card guide 50C with the first tab 62 in partial mating relationship with the card guide support track 30, and the snap-lock tab 32 in partial mating relationship with the clip 68, just prior to rotation of the card guide 50 about its axis. Likewise, card guides 50A, B show card guides after rotation where both the first tab 62 is in mating relationship with the card guide support track 32, and the clip 68 is in mating relationship with the snap lock tab 32. Movement in a vertical direction is restricted by the engagement of the first and second tabs 62, 64. Movement of the card guide in an axial direction (into or out of the drawing sheet of FIG. 2), is restricted by the engagement of the clip 68 with the snap-lock tab 32, as well as the stop 66 and shoulder 67. While FIG. 2 shows that the initial mating relationship should be between the first tab 62 and the card guide support track 30, installation of the card guides of the preferred embodiment may also take place by initially engaging the clip 68 with the snap-lock tab 32, and then rotating the first tab 62 into mating relationship with the card guide support track 30. Thus, the combination of the channels 30 and tabs 32 of the controller housing and the tab 62 and clip 68 of the card guide 50 form a tool-less connection.

In the preferred embodiments, the controller housing 10 (including the tracks 30 and snap-lock tabs 32) and the card guides 50 are made of injection molded ABS/polycarbonate material such as Bayblend® FR110 produced by BP Chemical, having a regrind content of 20% maximum, or an equivalent.

The housing 10 itself may be expanded to accommodate various card requirements. As noted above, the side panels 18, 20 may be removed. In addition, the side of the housing to which the panel 20 was attached includes slots 74 and clips 76 (FIG. 1). A second, identical housing (or several identical housings) 10 may be attached to the first using corresponding slots and clips. As a result, the housing 10 may be expanded according to card needs of the controller.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A structure of a controller housing comprising:
   a front panel, a back panel and two sides panels coupled together and defining an interior;
   an opening in the front panel that provides access to the interior, an upper portion of the opening having a first slot extending substantially perpendicular to the back panel, a lower portion of the opening having a second slot extending substantially parallel to the first slot;
   a first card guide coupled to the front panel of the controller housing only by way of a tool-less connection proximate to the front panel, the card guide having an elongate body and having card guide slots on opposing sides of the elongate body, one of the card guide slots in functional alignment with the first slot, and one of the card guide slots in functional alignment with the second slot; and
   wherein the card guide divides the opening such that electronic circuit cards may be inserted into the controller housing by sliding their card edges in the functionally aligned slots, and wherein the card guide may be removed without the use of tools such that an electronic circuit card may be inserted by sliding card edges of the electronic circuit card in the first and second slots.

2. The structure of a controller housing as defined in claim 1 further comprising:
   a second card guide coupled to the opening by way of a tool-less connection, the second card guide having an elongate body and having card guide slots on opposing sides of the elongate body;
   wherein the first and second card guides divide the opening such that a first electronic circuit card may be inserted by sliding card edges in the first slot and a slot of the first card guide, a second electronic circuit card may be inserted by sliding card edges in slots of the first and second card guides, and a third electronic circuit card installed by sliding card edges in the second slot and a slot of the second card guide; and
   wherein the second card guide may be removed without the use of tools.

3. The structure as defined in claim 1 wherein the controller housing is designed and constructed such that upon removal of one of the side panels, the controller housing couples to a second controller housing having an opposite side panel removed.

4. A structure of a controller housing comprising:
   a front panel, a back panel and two sides panels coupled together and defining an interior;
   an opening in the front panel that provides access to the interior, an upper portion of the opening having a first slot extending substantially perpendicular to the back panel, a lower portion of the opening having a second slot extending substantially parallel to the first slot;
   a first card guide coupled to the opening by way of a tool-less connection, the card guide having an elongate body and having card guide slots on opposing sides of the elongate body, one of the card guide slots in functional alignment with the first slot, and one of the card guide slots in functional alignment with the second slot;

a second card guide coupled to the opening by way of a tool-less connection, the second card guide having an elongate body and having card guide slots on opposing sides of the elongate body;

wherein the first and second card guides divide the opening such that a first electronic circuit card may be inserted by sliding card edges in the first slot and a slot of the first card guide, a second electronic circuit card may be inserted by sliding card edges in slots of the first and second card guides, and a third electronic circuit card installed by sliding card edges in the second slot and a slot of the second card guide;

wherein the first and second card guides may be removed without the use of tools;

wherein the tool-less connection of the first and second card guides each further comprise:
 a first portion of the card guide designed and constructed to fit in mating relationship with a first portion of the opening;
 a second portion of the card guide designed and constructed to fit in mating relationship with a second portion of the opening; and
 wherein installing each of the first and second card guides comprises placing the first portion of the card guide in at least partial mating relationship with the first portion of the opening, and rotating the card guide about its long axis until the second portion of the card guide is in mating relationship with the second portion of the opening.

5. The structure as defined in claim 4 wherein the tool-less connection of the first and second card guides each further comprise:
 a first tab of the card guide designed and constructed to fit in mating relationship with a first channel of the opening;
 a second tab of the card guide designed and constructed to fit in mating relationship with a second channel of the opening; and
 wherein installing each of the first and second card guides comprises placing the first tab of the card guide in at least partial mating relationship with the first channel of the opening, and rotating the card guide about its long axis until the second tab of the card guide is in mating relationship with the second channel of the opening.

6. A structure of a controller housing comprising:
 a front panel, a back panel and two sides panels coupled together and defining an interior;
 an opening in the front panel that provides access to the interior, an upper portion of the opening having a first slot extending substantially perpendicular to the back panel, a lower portion of the opening having a second slot extending substantially parallel to the first slot; and
 a first card guide coupled to the opening by way of a tool-less connection, the card guide having an elongate body and having card guide slots on opposing sides of the elongate body, one of the card guide slots in functional alignment with the first slot, and one of the card guide slots in functional alignment with the second slot;
 wherein the card guide divides the opening such that electronic circuit cards may be inserted into the controller housing by sliding their card edges in the functionally aligned slots, and wherein the card guide may be removed without the use of tools such that an electronic circuit card may be inserted by sliding card edges of the electronic circuit card in the first and second slots;

wherein the tool-less connection of the first card guide further comprises:
 a first portion of the card guide designed and constructed to fit in mating relationship with a first portion of the opening;
 a second portion of the card guide designed and constructed to fit in mating relationship with a second portion of the opening; and
 wherein installing the first card guide comprises placing the first portion of the card guide in at least partial mating relationship with the first portion of the opening, and rotating the card guide about its long axis until the second portion of the card guide is in mating relationship with the second portion of the opening.

7. The structure as defined in claim 6 wherein the tool-less connection of the first card guide further comprise:
 a first tab of the card guide designed and constructed to fit in mating relationship with a first channel of the opening;
 a second tab of the card guide designed and constructed to fit in mating relationship with a second channel of the opening; and
 wherein installing the first card guides comprises placing the first tab of the card guide in at least partial mating relationship with the first channel of the opening, and rotating the card guide about its long axis until the second tab of the card guide is in mating relationship with the second channel of the opening.

8. A structure of a controller housing comprising:
 a front panel, a back panel and two sides panels coupled together and defining an interior;
 an opening in the front panel that provides access to the interior, an upper portion of the opening having a first slot extending substantially perpendicular to the back panel, a lower portion of the opening having a second slot extending substantially parallel to the first slot; and
 a first card guide coupled to the opening by way of a tool-less connection, the card guide having an elongate body and having card guide slots on opposing sides of the elongate body, one of the card guide slots in functional alignment with the first slot, and one of the card guide slots in functional alignment with the second slot;
 wherein the card guide divides the opening such that electronic circuit cards may be inserted into the controller housing by sliding their card edges in the functionally aligned slots, and wherein the card guide may be removed without the use of tools such that an electronic circuit card may be inserted by sliding card edges of the electronic circuit card in the first and second slots;
 wherein the controller housing is designed and constructed such that upon removal of one of the side panels, the controller housing couples to a second controller housing having an opposite side panel removed;
 wherein the controller housing further comprises:
  a first protruding clip on a first side edge of the front panel, and a first notch on a second side edge of the front panel;
  a second notch on a first side edge of the back panel corresponding to the first side edge of the front panel, and a second protruding clip on a second side edge of the back panel corresponding to the second side edge of the front panel; and wherein the first protruding clip of the controller housing mates with a first notch of a second controller housing, and further wherein the second notch mates with a second protruding clip of a second controller housing.

9. A structure of a controller housing comprising:

a back panel adapted to hold a backplane board substantially parallel thereto;

a top panel;

a bottom panel;

a front panel coupled to the back panel by way of the top and bottom panels;

a rectangular opening through the front panel to allow insertion of an electronic circuit card into the controller housing;

a collar surrounding the rectangular opening;

a first card guide connection portion on a first inside location of the collar at an elevation, the first card guide connection portion comprising a receiving channel substantially perpendicular to the back panel; and a second card guide connection portion on a second inside location of the collar at the elevation, the second card guide connection portion comprising a tab structure substantially parallel to the front panel, the tab structure further comprising a notch in a distal end thereof, the notch defining a channel substantially perpendicular to the back panel;

wherein the first and second card guide connection portions are adapted to allow tool-less installation and removal of a device that divides the rectangular opening so that multiple electronic circuit cards may be inserted into the controller housing.

10. A card guide for a controller housing to allow insertion of varying form factor circuit cards into the controller housing, the card guide comprising:

a handle portion;

an elongate body coupled to and extending from the handle portion;

a first slot in an upper portion of the elongate body;

a second slot in a lower portion of the elongate body;

a first connection portion coupled to the elongate body proximate to the handle portion, the first connection portion designed and constructed to allow tool-less installation and removal of the card guide from the controller housing; and a second connection portion coupled to the elongate body proximate to the handle and on an opposing side of the elongate body, the second connection portion designed and constructed to allow tool-less installation and removal of the card guide from the controller housing.

11. The card guide as defined in claim 10 wherein the first connection portion further comprises a tab portion having a length of approximately 20% of the length of the card guide.

12. A card guide for a controller housing to allow insertion of varying form factor circuit cards into the controller housing, the card guide comprising:

a handle portion;

an elongate body coupled to and extending from the handle portion;

a first slot in an upper portion of the elongate body;

a second slot in a lower portion of the elongate body;

a first connection portion coupled to the elongate body proximate to the handle portion, the first connection portion designed and constructed to allow tool-less installation and removal of the card guide from the controller housing, wherein the first connection portion further comprises a tab portion having a length of approximately 20% of the length of the card guide; and a second connection portion coupled to the elongate body proximate to the handle and on an opposing side of the elongate body, the second connection portion designed and constructed to allow tool-less installation and removal of the card guide from the controller housing, wherein the second connection portion further comprises a clip having a set of closely spaced walls defining a gap between the walls.

13. The card guide as defined in claim 12 wherein the gap between the walls is greater than approximately 0.13 inches.

14. A method comprising:

adjusting a controller housing to accept electronic circuit cards of a varying form factor by coupling a card guide to the controller housing using a tool-less connection, and wherein coupling the card guide to the controller housing using a tool-less connection further comprises:

placing a first portion of the card guide in mating relationship with a first portion of the controller housing; then rotating the card guide; and thereby snapping a second portion of the card guide into mating relationship with a second portion of the controller housing.

15. The method as defined in claim 14 wherein coupling the card guide to the controller housing using a tool-less connection further comprises:

placing a first tab on the card guide within a channel on the controller housing; then rotating the card guide; and thereby snapping a second tab on the card guide into mating relationship with a second channel on the controller housing.

16. A method comprising:

adjusting a controller housing to accept electronic circuit cards of a varying form factor by uncoupling a card guide in the controller housing using a tool-less connection, and wherein uncoupling the card guide from the controller housing using a tool-less connection further comprises:

rotating the card guide; and thereby snapping a first portion of the card guide out of mating relationship with a first portion of the controller housing; and then removing a second portion of the card guide from mating relationship with a second portion of the controller housing; and then removing the card guide from the controller housing.

17. The method as defined in claim 16 wherein coupling the card guide to the controller housing using a tool-less connection further comprises:

rotating the card guide; and thereby snapping a first tab on the card guide out of mating relationship with a channel of the controller housing; and then removing a second tab on the card guide from mating relationship with a second channel of the controller.

18. A method comprising:

inserting a card guide having a handle portion and an elongated body into an opening of a housing with the elongated body portion leading the handle portion into the opening;

placing a first portion of the card guide in mating relationship with a first portion of the housing proximate to a first side of the opening;

rotating the card guide; and thereby snapping a second portion of the card guide into mating relationship with a second portion of the housing proximate to a second side of the opening.

19. A method comprising:

rotating a card guide having a handle portion and an elongated body, the card guide having been previously placed within an opening of a housing; and thereby snapping a first portion of the card guide out of mating relationship with a portion of the housing proximate to a first side of the opening;

removing a second portion of the card guide from mating relationship with a second portion of the housing proximate to a second side of the opening; and removing the card guide from the housing with the handle portion leading the elongated body portion away from the opening.

20. A structure of a controller housing comprising:

a back panel adapted to hold a backplane board substantially parallel thereto;

a top panel;

a bottom panel;

a front panel coupled to the back panel by way of the top and bottom panels;

a rectangular opening through the front panel to allow insertion of an electronic circuit card into the controller housing;

a collar surrounding the rectangular opening;

a first card guide connection portion on a first inside location of the collar at an elevation, the first card guide connection portion comprising a receiving channel substantially perpendicular to the back panel; and a second card guide connection portion on a second inside location of the collar at the elevation, the second card guide connection portion comprising a notch defining a channel substantially perpendicular to the back panel;

wherein the first and second card guide connection portions are adapted to allow tool-less installation and removal of a device that divides the rectangular opening so that multiple electronic circuit cards may be inserted into the controller housing.

21. A card guide for a controller housing to allow insertion of varying form factor circuit cards into the controller housing, the card guide comprising:

a handle portion;

an elongate body coupled to and extending from the handle portion;

a first slot in an upper portion of the elongate body;

a second slot in a lower portion of the elongate body;

a first connection portion coupled to the elongate body proximate to the handle portion, the first connection portion designed and constructed to allow tool-less installation and removal of the card guide from the controller housing; and a second connection portion coupled to the elongate body proximate to the handle and on an opposing side of the elongate body, the second connection portion designed and constructed to allow tool-less installation and removal of the card guide from the controller housing, wherein the second connection portion further comprises a clip having a set of closely spaced walls defining a gap between the walls.

* * * * *